(12) United States Patent
Hwang et al.

(10) Patent No.: US 12,526,118 B2
(45) Date of Patent: Jan. 13, 2026

(54) SYSTEMS AND METHODS FOR COMMUNICATION NETWORK PERFORMANCE

(71) Applicant: PHYTunes, Inc., Palo Alto, CA (US)

(72) Inventors: Chan-Soo Hwang, Cupertino, CA (US); Jisung Oh, Palo Alto, CA (US); Akula Aneesh Reddy, San Jose, CA (US); Kenneth R. Cioffi, San Jose, CA (US)

(73) Assignee: PHYTunes, Inc., Palo Alto, CA (US)

( * ) Notice: Subject to any disclaimer, the term of this patent is extended or adjusted under 35 U.S.C. 154(b) by 122 days.

(21) Appl. No.: 18/382,480

(22) Filed: Oct. 21, 2023

(65) Prior Publication Data

US 2025/0132886 A1 Apr. 24, 2025

(51) Int. Cl.
*H04L 5/00* (2006.01)
*H04B 7/0452* (2017.01)

(52) U.S. Cl.
CPC ......... *H04L 5/0073* (2013.01); *H04B 7/0452* (2013.01)

(58) Field of Classification Search
CPC ............................ H04L 5/0073; H04B 7/0452
See application file for complete search history.

(56) References Cited

U.S. PATENT DOCUMENTS

| | | | |
|---|---|---|---|
| 2012/0140642 A1 | 6/2012 | Beck et al. | |
| 2013/0124688 A1 | 5/2013 | Huh et al. | |
| 2013/0137451 A1 | 5/2013 | Meredith et al. | |
| 2015/0270882 A1 | 9/2015 | Shattil | |
| 2016/0366554 A1 | 12/2016 | Markhovsky et al. | |
| 2020/0037325 A1 | 1/2020 | Chu et al. | |
| 2020/0045744 A1* | 2/2020 | Sun | H04W 74/0808 |
| 2023/0076697 A1 | 3/2023 | Silverman et al. | |
| 2025/0119760 A1* | 4/2025 | Khalid | H04W 24/08 |

OTHER PUBLICATIONS

International Search Report and Written Opinion of the International Searching Authority mailed Jan. 22, 2025 in related PCT application No. PCT/US2024/052162, (16 pgs).

* cited by examiner

*Primary Examiner* — Vineeta S Panwalkar
(74) *Attorney, Agent, or Firm* — Michael North (57) ABSTRACT

Systems and methods resolve the hidden node problem in Wi-Fi communications and significantly reduce intra-extended service set (ESS) interference management and inter-ESS interference, thereby, improving network performance and enhancing user experience. In various embodiments, this is achieved by using connection discovery techniques that optimize user device associations with radio frequency (RF) units and streamline network management. Certain techniques leverage power detectors and timing references for efficient device identification and interference management. Further, some embodiments optimize multi-user multiple-input multiple-output (MU-MIMO) applications by improving user device selection and increasing areal capacity using two-antenna RF units.

20 Claims, 10 Drawing Sheets

SYSTEMS AND METHODS FOR COMMUNICATION NETWORK PERFORMANCE

BACKGROUND

A. Technical Field

The present disclosure relates generally to systems and methods for information handling systems, such as networking devices. More particularly, the present disclosure relates systems and methods for increasing performance in wireline-wireless communication networks.

B. Background

The relentless demand for reliable connectivity in wired and wireless network applications, including in Wi-Fi ecosystems, places significant pressure on existing network architectures. Conventional designs necessitate continuous software and hardware upgrades to keep pace to adapt to the evolving demands of modern applications. For example, traditional Wi-Fi systems that employ a central switch for Internet connectivity and an array of access points (APs) that facilitate user device communication with the Internet, suffer from a range of design limitations.

Accordingly, what is needed are systems and methods that address the shortcomings of existing designs to meet the escalating demands of communication networks.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification do not necessarily all refer to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

Any headings used herein are for organizational purposes only and shall not be used to limit the scope of the description or the claims. Each reference/document mentioned in this patent document is incorporated by reference herein in its entirety.

It is noted that embodiments described herein are framed mainly in the context of Wi-Fi networks, but one skilled in the art shall recognize that the concepts of the present disclosure are not so limited and may equally be used in cellular networks and other contexts to improve throughput and overall network performance in communication systems. In this document, the term "matrix diagonalization" refers to both complete matrix diagonalization, i.e., operation results in a diagonal matrix, and "block diagonalization," i.e., operation results in a block diagonal matrix.

Figure 1:
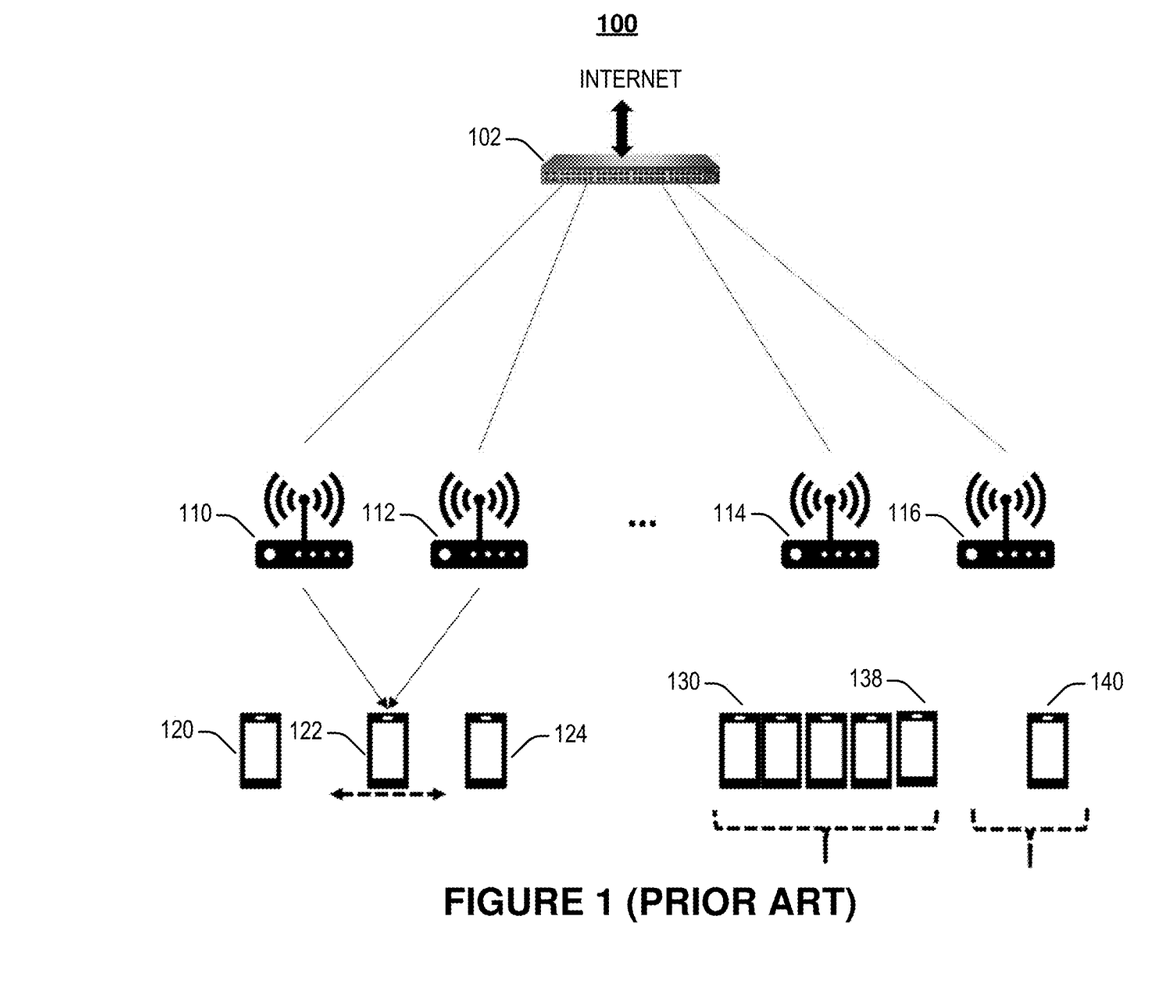
FIG. 1 depicts a Wi-Fi network environment using conventional access points (APs) to communicate with user devices.

FIG. 1 depicts a Wi-Fi network environment using conventional access points (APs) to communicate with user devices. As depicted, network 100 comprises switch 102 that connects user devices 120-140 to the Internet via Wi-Fi APs 110-116. Switch 102 is connected to APs 110-116 via Ethernet cables that can be as long as 100 meters. Because the Ethernet cables, like the majority of Ethernet cables installed in existing setups, support only 1 Gbps at 100 meters, this significantly restricts backhaul capacity. Such cables are not suitable for meeting the bandwidth demands of more advanced Wi-Fi communication systems that require high-speed Ethernet cables that support transmission speeds of 10 Gbps or higher.

As Wi-Fi standards continue to evolve, access points 110-116 shown in FIG. 1 frequently become outdated, typically requiring replacement every 2-3 years, again, requiring costly and labor-intensive hardware upgrades. This problem is compounded if, as is oftentimes the case when access points 110-116 are ceiling-mounted devices. Such a setup also makes access points 110-116 difficult to maintain.

Further, once a user device (e.g., 122) is located midway between two access points (e.g., 110 and 112), which transmit signals having the same frequency, user device 122 will be susceptible to radio frequency (RF) interference between those signals. In the context of Wi-Fi applications, when device 122 moves closer to one of the two access points (e.g., 110), roaming or handoff procedures require disconnecting and reconnecting, along with association and disassociation steps. Such procedures interrupt communication between access points 110-116 and increase the latency that would otherwise be shorter for communicating content. In addition, authentication operations that use, e.g., a Wi-Fi controller, disrupt roaming operations; thus, further increasing latency. Unwanted side-effects include, for example, dropped Voice over Internet Protocol (VOIP) calls, resulting from a failed or delayed Wi-Fi handoff from one network to another, unlike the seamless handoffs in cellular networks.

Furthermore, if Wi-Fi access points 110-116 in FIG. 1 are deployed throughout a building (not shown), they are configured to support a capacity under the assumption of peak throughput for any given access point. This anticipates changes in user traffic patterns over time and across various areas. However, it also leads to expensive overdesign and underutilization of available bandwidth.

Therefore, it would be desirable to have systems and methods that overcome the limitations of existing designs in both wired and wireless network applications and support the lower latency and higher data rates and/or throughput requirements of modern networks.

Figure 2:
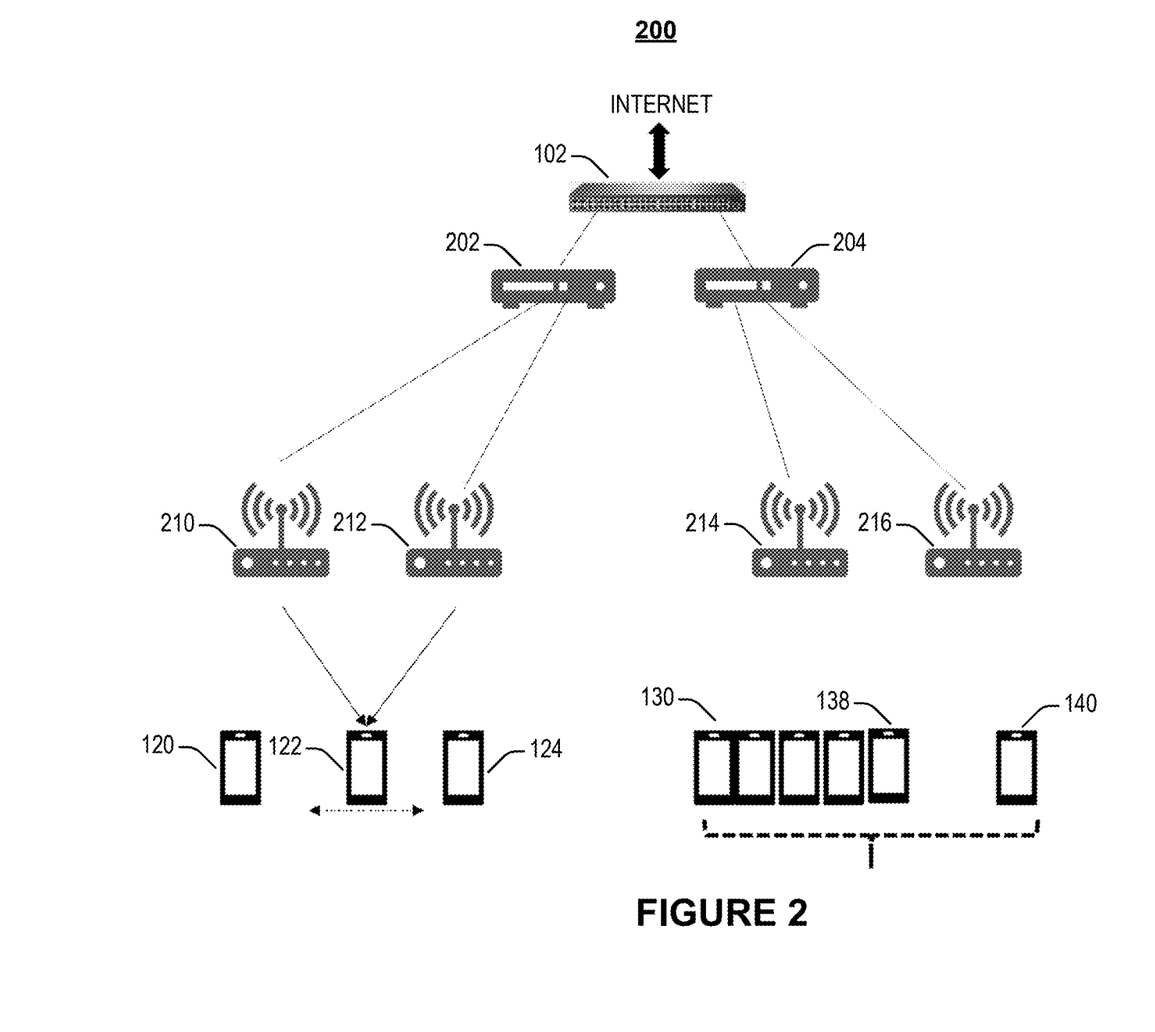
FIG. 2 illustrates a system for Wi-Fi communication using intermediate nodes according to various embodiments of the present disclosure.

FIG. 2 illustrates a system for Wi-Fi communication using intermediate nodes according to various embodiments of the present disclosure. For clarity, components similar to those shown in FIG. 1 are labeled in the same manner. Unlike in FIG. 1, system 200 in FIG. 2 comprises intermediate nodes 202-204 that each may comprise any number of antennas. An exemplary intermediate node is described in U.S. patent application Ser. No. 18/233,313, filed on Aug. 12, 2023, entitled "Personalized Wi-Fi Systems and Methods," and listing as inventors Chan-Soo Hwang et. al., which application is herein incorporated by reference as to its entire content.

In operation, intermediate nodes 202-204 may perform baseband processing and, as depicted, they connect RF units 210-216 to switch 102 such as to facilitate communication between user devices 120-140 and the Internet. Further, intermediate nodes 202-204 may perform RF processing. In embodiments, intermediate nodes 202-204 may comprise a common access point. In practice, intermediate nodes 202-204 may be installed in proximity to switch 102, e.g., on the same rack allowing for seamless device integration or for connecting the intermediate node 202-204 with switch 102 using relatively short cables. Unlike the design in FIG. 1, this may be accomplished, advantageously, without the expense of replacing numerous Ethernet cables that each is dozens of meters in length. It is noted that, as long as the difference in total propagation delay between a user device and an intermediate node is within the cyclic prefix length, interference management, discussed in greater detail below, may be performed irrespective of existing Wi-Fi cable lengths that rarely exceed 100 m.

In embodiments, RF units 210-216 may be implemented as relatively simple RF devices that are easy to maintain and rarely require upgrades, if any. This allows RF units 210-216 to use simple chipsets having RF capabilities without the need for processing power to perform complex operations typically performed by traditional Wi-Fi access points and, e.g., without the need for baseband processing in beam forming applications or similar technologies. Therefore, unlike in prior art designs, such as that shown in FIG. 1, as long as bandwidth and carrier frequencies remain substantially the same, RF units 210-216 may be ceiling-mounted without requiring expensive hardware upgrades every few years or other changes to existing installations. Further, since RF units 210-216 are relatively small and lightweight, they may be easily mounted to surfaces by using magnets, glue, or similar installation methods. Furthermore, RF units 210-216 may be portable such that they can be installed when and where needed. It is noted that intermediate nodes 202-204 may be upgraded from time to time, e.g., to accommodate new features and changes in Wi-Fi standards to take advantage of continued increases in backhaul capacity. Advantageously, a backhaul capacity increase that would require an upgrade of physical Ethernet cables between intermediate nodes 202-204 and Ethernet switch/gateway 102 would be relatively less costly than upgrading physical cables between RF units 210-216 and switch 102 as the length of the former cables is shorter, especially if intermediate nodes 202-204 may be located in the same or a nearby network rack as Ethernet switch 102.

In embodiments, RF units 210-212 may receive the same signal from intermediate node 202 and wirelessly transmit the signal to user device 122 that, in embodiments, combines the two signals received from RF units 210-212 in a manner such that user device 122 can decode the two signals together. Advantageously, this may be accomplished without the received signals interfering with each other. As an added advantage, the received signals constructively combine to enhance the received signal power, thereby improving communication range.

In embodiments, intermediate nodes 202-204 or a network manager (not shown in FIG. 2) may facilitate interference management by performing operations such as frequency/timing/special resource allocation operations and control of the connections between antenna ports of intermediate nodes 202-204 and RF units 210-212 to mitigate interference and further enhance signal quality. RF units 210 and 212 may broadcast at a given frequency and at the same time to user device 122 on two different paths. Advantageously, the two RF signals may be constructively combined at user device 122.

In embodiments, resources may be pooled to take advantage of the capacities of each of intermediate node 202-204. As an example, all user devices 130-140 may be connected to the same intermediate node (e.g., 204). In addition, user devices 130-140 may be dynamically switched, e.g., between RF units 214 and 216. As a person of skill in the art will appreciate, the teachings herein may equally be applied to other architectures.

Generally, in conventional handoff procedures, when a user device roams from one AP (or mesh node) to another one, the serving AP for the user device must change (roaming). If two APs operate at the same frequency, excessive interference may lead to poor signal quality and oftentimes cause, e.g., calls to drop due to the signals from two APs or mesh nodes destructively combining at the user device. Even if the two APs use different frequencies, roaming may be delayed due to association and authentication requirements.

In contrast, in various embodiments herein, two RF units (e.g., 210-212) may transmit the RF signals originating from the same baseband transmitter to a user device (e.g., 122) with a slight time delay that is induced in a manner such that the delay remains within the cyclic prefix. As a result, unlike in conventional handoff procedures, the signals that user device 122 receives from RF units 210-212 may constructively combine without experiencing destructive interference, and without requiring additional adjustments to remain within a margin of error. It is noted that the transmission from a user device to an intermediate node via two or more RF units may operate similarly and, thus, does not require additional adjustment for constructively combining signals.

It is noted that in Wi-Fi applications, the cyclic prefix is shorter than for 5G applications. Further, since RF units 210-212 share the same network, a traditional handoff operation is not required, thus, successfully reducing the risk of established connections being jeopardized. Furthermore, the resulting higher gain (e.g., 3 dB at the edge of the coverage areas) advantageously increases coverage area (e.g., by 21%-41% depending on the propagation environment).

Figure 3A:
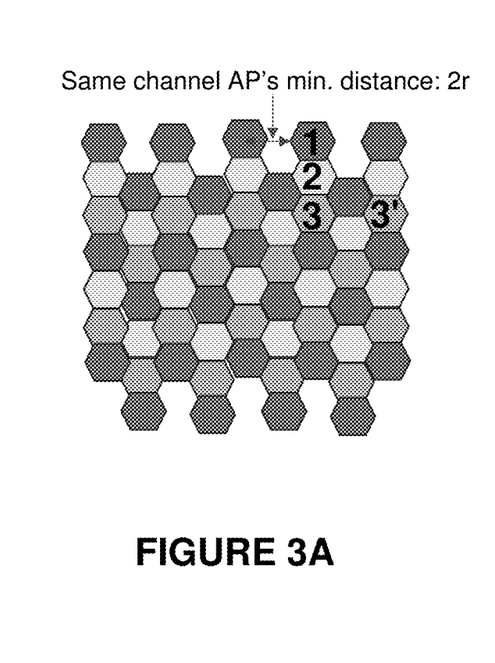
FIG. 3A-3C illustrate intra-extended service set (ESS) interference management and inter-ESS interference management, according various to embodiments of the present disclosure.
Figure 3B:
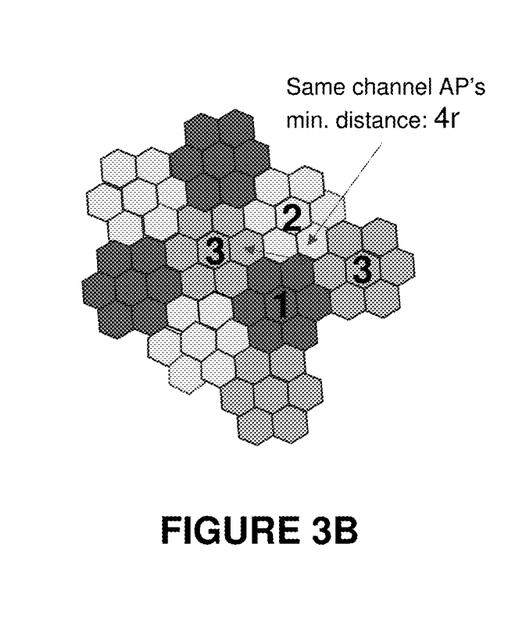
Figure 3C:
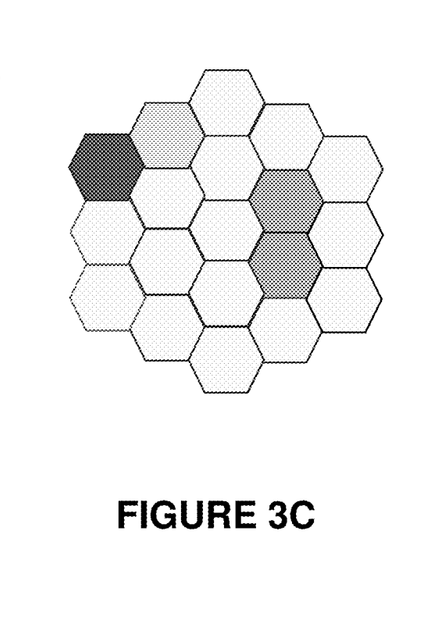

Modern Wi-Fi6 access points can support about 500 clients. However, the number of clients is limited by interference and congestion of the wireless medium. Congestion is caused either by intra-ESS interference or by inter-ESS interference. FIG. 3A-3C illustrate intra-extended service set (ESS) interference management and inter-ESS interference management, according various to embodiments of the present disclosure.

FIG. 3A depicts an inter-cell plot for a common deployment of APs with a reuse factor of three. In conventional frequency planning, different colors within the same ESS represent different frequencies, e.g., different guest access points using the same SSID and being under the same Wi-Fi management system may be represented with different colors if they use different frequencies. Colors are coordinated in a way that no two neighboring cells are of the same color. To minimize interference between access points, the 63 cells in FIG. 3A are coordinated in a way such that three colors of spatially separated cells, which correspond to three frequency spectra, do not overlap.

In practice, however, in Wi-Fi applications, which involve two ranges, a communication range and medium access control range, if an access point detects a signal that exceeds a certain power threshold, e.g., the clear-channel assessment (CCA) threshold such as −76 dBm, which supports the lowest MCS level at an 80 MHz bandwidth, the access point, ideally, refrains from commencing transmission to avoid interference. This precaution is taken to prevent interference, under the assumption that another AP is currently transmitting on the same frequency channel. However, for high-rate data communication, cells are designed based on a different threshold for their communication, e.g., all RF transmission signals within the cell are above −67 dBm to ensure the use of 16 QAM with ½ code rate, resulting in data rates of, e.g., 234 Mbps when employing 2×2 MIMO technology and an 80 MHz bandwidth. Therefore, any given cell (e.g., the cell denoted as numeral 3 in FIG. 3A) may surpass the radius of interference with its neighboring six access points to reach the cell denoted as 3' that uses the same frequency. As a result, despite frequency planning efforts, spatially separated cells 3 and 3' may interfere with each other and cause intra-ESS interference, i.e., interference between access points that share the same ESS identifier (ESSID) or network name (under the same Wi-Fi management entity).

Embodiments herein address intra-ESS interference issues by increasing effective cell size, as shown in FIG. 3B. As depicted the frequency reuse factor of three is still the same as in FIG. 3A, and different clusters of (here, seven) RF units are utilized to cover an area that is significantly larger than that associated with the single RF unit in FIG. 3A. Intuitively, by considerably increasing cell size, the distance between cells having the same frequency (e.g., cell 3 and 3' in FIG. 3A) will also increase. Thus, in embodiments, cell size may be increased by, e.g., doubling the distance between an access point and the nearest interfering user device in two clusters of access points that have the same frequency. As shown in FIG. 3B, the same channel access point minimum distance is increased from 2r to 4r where r is the radius of the cell. Assuming the absence of access points that use the same frequency but under a different ESS, i.e., under a different Wi-Fi management, existing access points can be successfully managed to reduce undesirable congestion and connection disruptions caused by unwanted intra-ESS interference.

In embodiments, to further reduce congestion resulting from inter-ESS interference, different RF units associated with different cells may be selectively enabled, e.g., as they are needed. This advantageously also conserves energy.

Figure 4A:
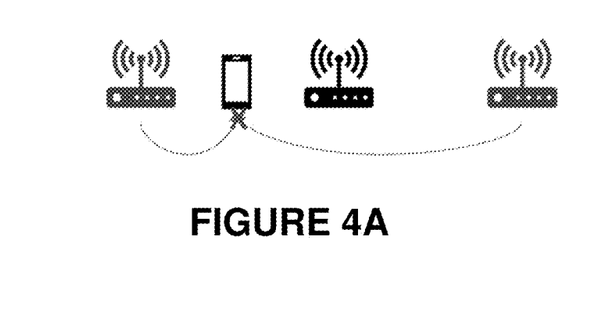
FIG. 4A and FIG. 4B illustrate the well-known hidden node problem associated with Wi-Fi networks.
Figure 4B:
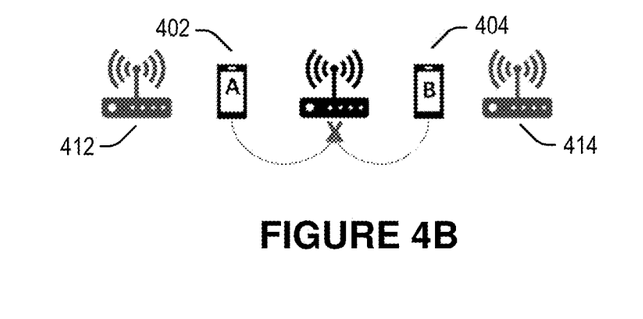
Figure 4C:
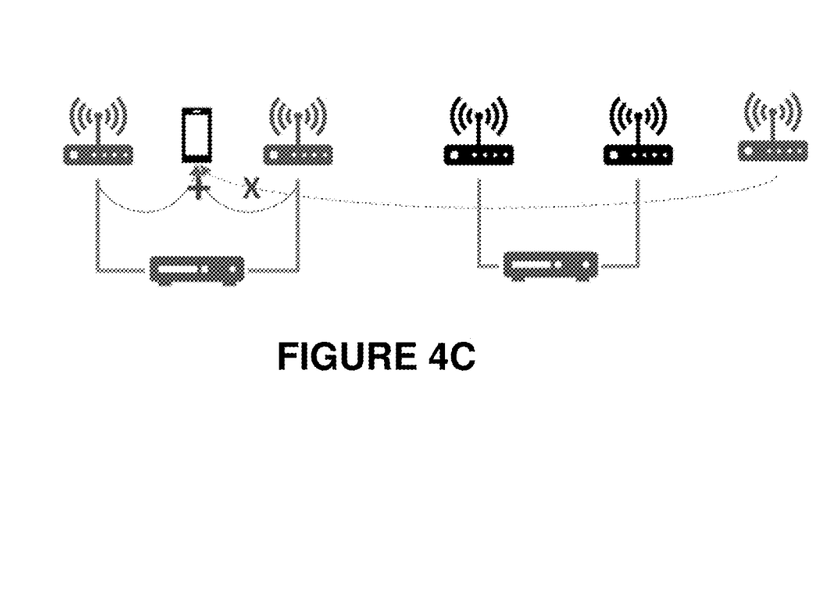
FIG. 4C and FIG. 4D depict solutions to the problem illustrated in FIG. 4A and FIG. 4B according to various embodiments of the present disclosure.
Figure 4D:
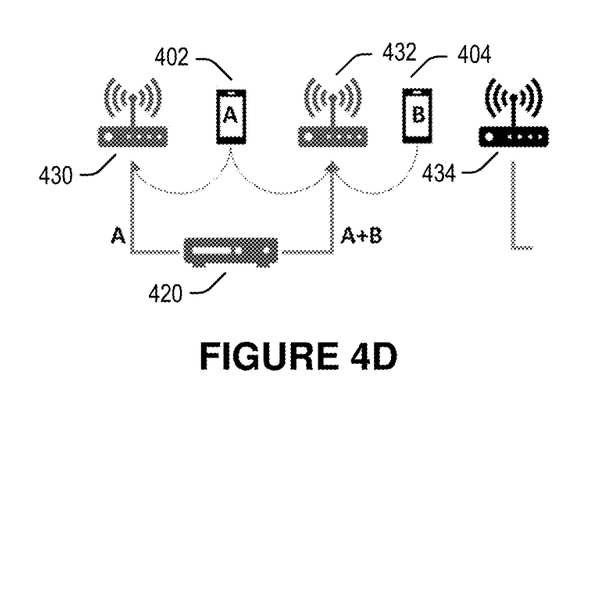

FIG. 4A and FIG. 4B illustrate the well-known hidden node problem associated with Wi-Fi networks. FIG. 4C and FIG. 4D depict solutions to the problem illustrated in FIG. 4A and FIG. 4B according to various embodiments of the present disclosure. In FIG. 4B, even if user devices 402 and 404 (denoted as A and B, respectively) can communicate with access point 410 and are within the same network, neither of user devices 402 nor 404 (e.g., cell phones) can directly detect each other's presence due to range limitations of their wireless signals. For example, when user device 402 is transmitting data to access point 410 within the same channel or frequency range as user device 404, user device 404 will not be aware of the ongoing communication between device 402 and access point 410 since user device 404 will be out of the communication range of user device 402 and, thus, may commence its own transmission. This, however, may cause access point 410 to experience interference during its communication with user device 402 due to the fact that devices 402 and 404 operate on the same wireless channel. As a result, the signals of user devices 402 and 404 may overlap and cause unwanted interference and collision that will result in the corrupted reception of data, thus, forcing user devices 402 and 404 to retransmit their data, thereby, wasting time and bandwidth, and decreasing network performance. The hidden node problem is exacerbated in AP-to-AP communications (FIG. 4A) as APs transmit more often.

Some approaches use the Request to Send (RCS) and Clear to Send (CTS) handshake mechanism of the Carrier Sense Multiple Access with Collision Avoidance (CSMA/CA) Wi-Fi network protocol to mitigate such collisions to determine whether a channel is idle before commencing transmission. However, while this may reduce the likelihood of collisions and mitigate most of the hidden node problems, collisions may still occur, especially in areas with a high density of user devices.

In some embodiments herein, in AP-to-AP communications (FIG. 4C), RF units associated with the same switch suffer fewer hidden node problems and improve the overall performance of the wireless network, even without utilizing RTS/CTS techniques. For example, by increasing the frequency reuse distance, the inter-intermediate node hidden node problem is successfully prevented. Similarly, in AP-to-user device cases (FIG. 4D), the intermediate node receives interference-free signals, which aids Wi-Fi modems in resolving hidden node problems. Advantageously, any number of antennas may be connected to an intermediate node to overcome the hidden node problem.

As depicted in FIG. 4D, RF unit 430 and RF unit 432 are coupled to intermediate node 420. Assuming that user devices 402 and 402 (denoted as A and B) operate on the same channel and transmit at the same time, the signal (signal A) that intermediate node 420 receives from RF unit 430 is associated with user device 402, and the composite signal (signal A+B) that intermediate node 420 receives from RF unit 432 is associated with both user devices 402 and 404.

In embodiments, the MIMO receiver in intermediate node 420 may subtract signal A from signal A+B to recover signal B, thereby, resolving the interference issue. If one RF unit (e.g., 430) is located closer to a particular user device (e.g., 402) than the other RF unit (e.g., 432), each separate RF unit 430 and 432 may receive a different signal (here, A and A+B) from user devices 402 and 404. Thus, RF units 430 and 432 may have uncorrelated views of the two signals A and B, which aids in signal separation in the MIMO receiver in intermediate node 420. This assumption holds especially true when RF units 430 and 432 are positioned at a considerable distance from each other.

In embodiments, a mapping between antenna ports in intermediate node 420 and one or more antennas in each of RF unit 430 and RF unit 432 may take into account a spatial separation or distance between RF units 430 and 432. As an example, assuming RF units 430 and 432 are connected to respective antenna ports 1 and 2 (not shown in FIG. 4D) in intermediate node 420, the MIMO receiver in intermediate node 420 may utilize the mapping to resolve the interference. In addition, the connections between intermediate node 420 and other radio devices (e.g., 434) may be disabled to ensure that intermediate node 420 receives no extraneous interference signals.

In such embodiments, the different signals that intermediate node 420 received from the two locations tend to be uncorrelated or linearly independent. This scenario can be likened to a system of two equations with two variables, permitting the use of known mathematical techniques to disentangle the two signals. As a result, intermediate node 420 may relatively easily correct for or cancel out unwanted signals gathered at the same location. For instance, this could involve subtracting signal A with a specific coefficient to cancel out signal A from the composite signal A+B and, ultimately, decode the two respective signals A and B.

In contrast, assuming that access point 410 in FIG. 4B were used, since the antennas in access point 410 are located in the same area, it would be practically impossible to obtain two different views of signals A and B. In essence, this amounts to an underdetermined system that resembles a single equation with two variables that lacks a mathematical solution. As a result, unlike embodiments herein, AP 410 would not be able to decode superposed signal A+B.

Figure 5A:
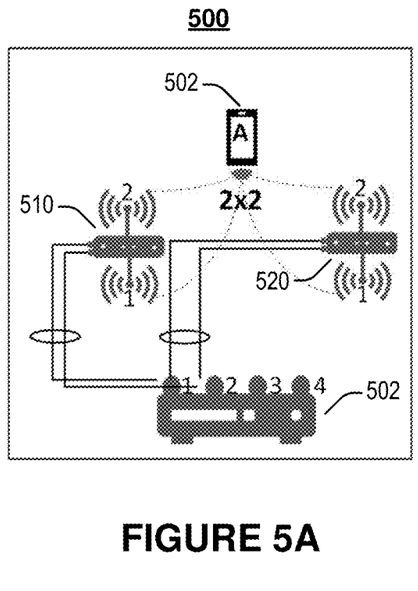
FIG. 5A illustrates a 2×2 Multiple-Input Multiple-Output (MIMO) system used in range extension mode according to various embodiments of the present disclosure.

FIG. 5A illustrates a 2×2 Multiple-Input Multiple-Output (MIMO) system used in range extension mode according to various embodiments of the present disclosure. As depicted in FIG. 5A, system 500 comprises intermediate node 502 having four ports, each of RF units 510 and 520 comprise two antennas; user device 504 (e.g., cell phone) having two antennas. Assuming ports 1 and 2 of intermediate node 502 are coupled to respective antennas 1 and 2 of each of RF unit 510 and 520. RF units 510 and 520 may serve to simultaneously transmit redundant copies of the same data in independent data streams in different spatial paths. The two independent data streams are then received and combined by the two antennas of user device 504 to create a stronger signal that is possible with only one communication path. This spatial diversity and larger received power allows for an increased range of the communication link between user device 504 and RF units 510, 520 since the topology makes the communication link more robust and less prone to signal degradation due to attenuation and interference effects, thus, increasing connection reliability. The increase in received power, by up to 3 dB, can increase range by 21% to 41% depending on the propagation environment. The spatial diversity effect can increase the range by overcoming shadowing, which may be in the order of 3 dB to 20 dB signal power improvement depending on the source of the shadowing.

Figure 5B:
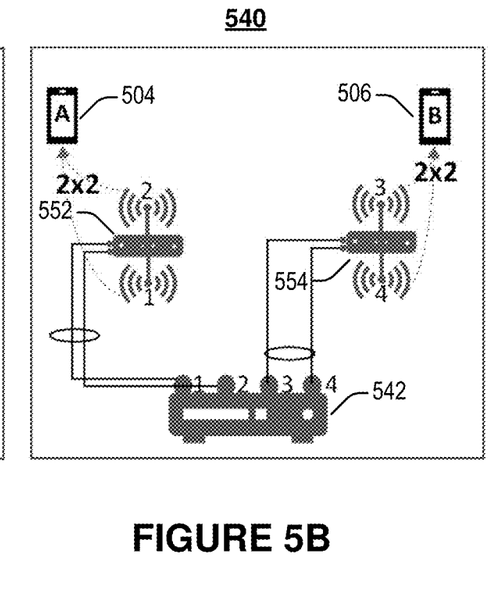
FIG. 5B illustrates a system in Multi-User-MIMO (MU-MIMO) mode according to various embodiments of the present disclosure.

FIG. 5B illustrates a system in Multi-User-MIMO (MU-MIMO) mode according to various embodiments of the present disclosure. In a manner similar to FIG. 5A, antennas 1 and 2 of intermediate node 542 are coupled to RF unit 552. Antennas 1 and 2 of intermediate node 542 are coupled to antennas 3 and 4 of RF unit 554. To facilitate multiuser MIMO, in embodiments, up to four user devices (e.g., 504, 506) may be connected to the four RF ports of intermediate node 542. Advantageously, since the received signal matrix forms close to the block diagonal shape, the MIMO channel matrix processing of a plurality of data streams from a plurality of user devices and antennas is drastically simplified.

In embodiments, antennas 1 and 2 in FIG. 5B may receive a signal only from user device 504 that may be located relatively closer to RF unit 552 than to RF unit 554, and antennas 3-4 may receive a signal from user device 506 that may be located relatively closer to RF unit 554 than to RF unit 552. Due to the separation of RF units 552 and 554 and the corresponding association between RF units and RF ports, the MU-MIMO matrix will become block diagonal (i.e., the signals in antenna ports 1,2 will be uncorrelated with the signals in antenna ports 3,4). As a result of block diagonalization, a plurality of streams may be independently decoded without having to perform any computations. Advantageously, this type of configuration may improve multiuser MIMO applications since it enhances orthogonal user deceive selection, which improves throughput among combinations of user device selection. As discussed further below, user devices that are located relatively far away from each other are more likely to provide most satisfactory outcome.

Figure 5C:
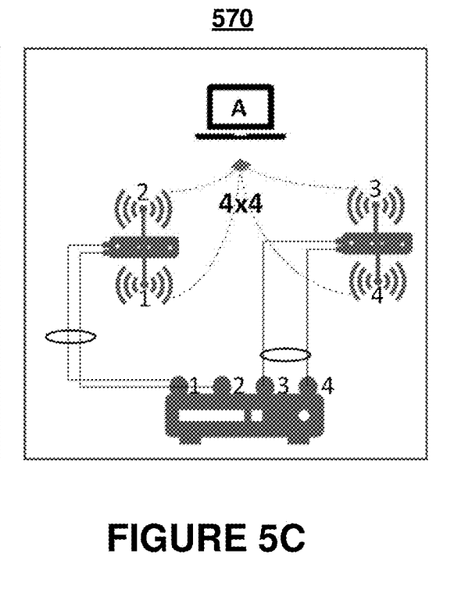
FIG. 5C illustrates a system in Single-User-MIMO (SU-MIMO) mode according to various embodiments of the present disclosure.

FIG. 5C illustrates a system in Single-User-MIMO (SU-MIMO) mode according to various embodiments of the present disclosure. System 570 in FIG. 5C comprises user device 504, RF units 582 and 584 comprise two antennas, and intermediate node 572 comprises four ports 1-4. In embodiments, intermediate node 572 may be implemented as a high-capacity device that may be shared by some or all RF units (e.g., 582 and 584).

As depicted in FIG. 5C, each RF antenna is coupled to a different port on intermediate node 572. In this manner, four spatial streams may be created. Depending on traffic pattern, user pattern, etc., the connections at RF ports 1-4 may, thus, be dynamically switched, which allows for capacity pooling, e.g., when areal traffic density varies over time.

It is understood that the connections between antennas in the intermediate node and antennas in the RF units at FIG. 5A-FIG. 5C may be dynamically updated, e.g., depending on an active user's location, the location of radio tuners, traffic density, and the like.

Figure 6A:
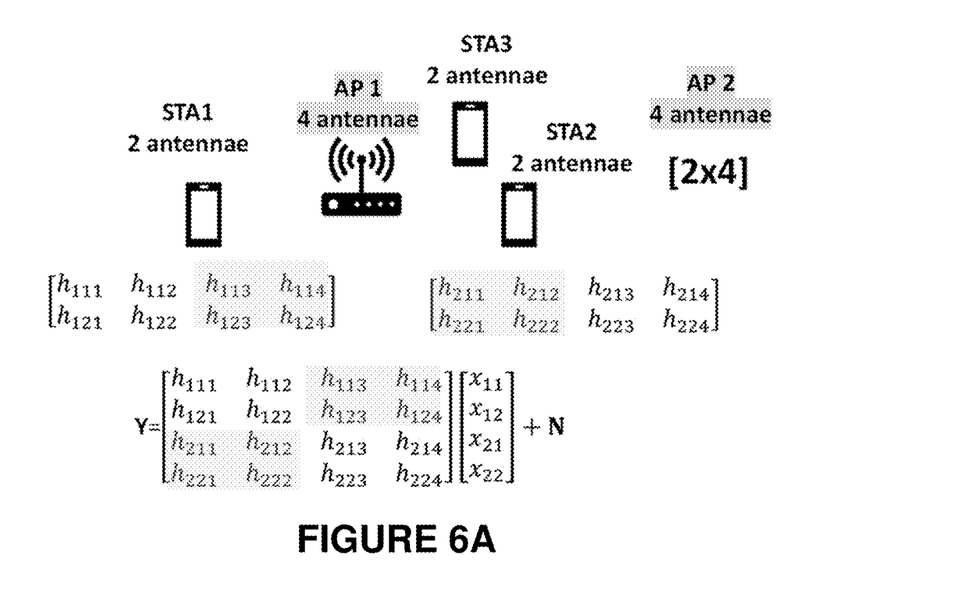
FIG. 6A depicts a prior art multi-user MIMO system in which all transmitted signals are received by all receiver antennas.
Figure 6B:
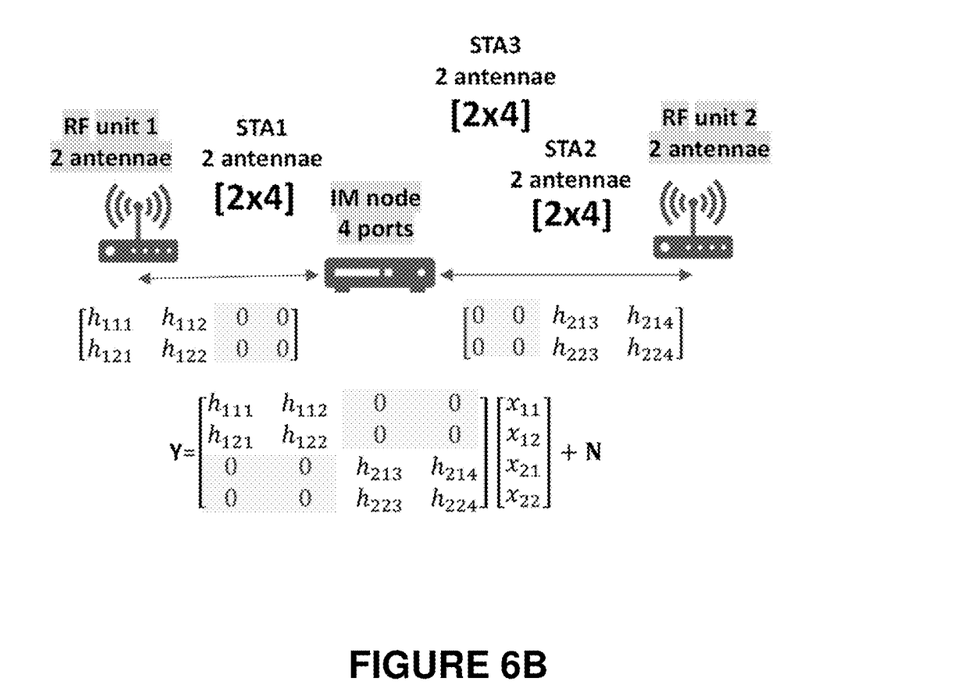
FIG. 6B depicts a multi-user MIMO system according to various embodiments of the present disclosure.

FIG. 6A depicts a prior art multi-user MIMO system in which all transmitted signals are received by all receiver antennas that are collocated at an access point. Most user devices contain two antennas and rely on multi-user MIMO techniques to achieve maximum areal throughput. However, in such applications systems suffer from receiver antenna correlation problems and make it difficult to find the best user device combination of two or four user devices that can be scheduled together. In contrast, in various embodiments, a diagonal MIMO channel for MU-MIMO modes may be used such that transmitted signals are received only by distributed RF units. As illustrated in FIG. 6B, received signals are independent and relatively easy to process. In embodiments, the MIMO channel matrix becomes block diagonal or diagonal matrix, which makes it relatively easy to find the best user device combination and perform receiver MIMO processing operations.

In fact, in embodiments, two-antenna RF units may provide higher areal capacity than compared to common access points having four antennas. This is mainly due to (1) higher capacity MIMO channel (block diagonal w/less correlation); (2) higher probability of pairing MU-MIMO user devices as covering up to the number of RF units (e.g., eight) multiplied by the area provides a (here, eight-fold) increase in candidates, thus, improving signal-to-noise ratio by a factor of $\log_2(8)$; and (3) the best user device combination is easy to select. Since common user devices such as cell phones continue to have two antennas, two-antenna RF unit embodiments herein are capable of providing the same per-user-device throughput as common four-antenna Wi-Fi systems while, simultaneously, providing higher per intermediate node/AP throughput.

In embodiments, in 5G applications that, unlike analog applications that do not introduce any delay, a base station may compensate for variable delays caused by moving user devices. Further, it is understood that the propagation speed for different applications may be different. For example, for wireline applications, propagation speed may be 1.5 times slower than for wireless applications.

Figure 7A:
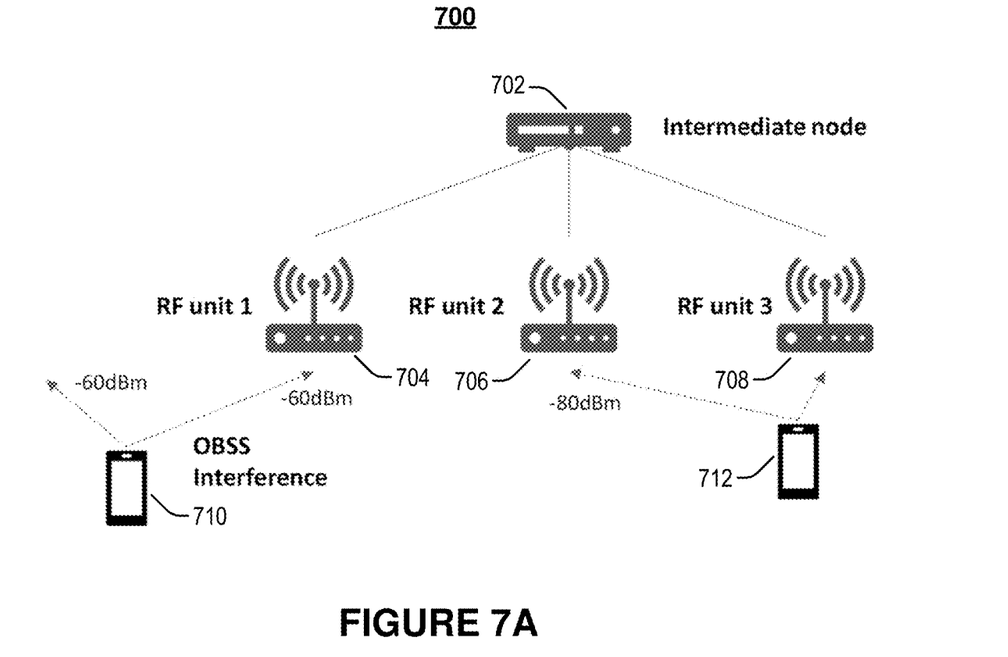
FIG. 7A illustrates connection discovery in a network according to various embodiments of the present disclosure.

FIG. 7A illustrates connection discovery in a network according to various embodiments of the present disclosure. In FIG. 7A, connection discovery serves as a method to detect which user device is coupled to which RF unit(s) within a network. As depicted, network 700 comprises intermediate node/Wi-Fi AP 702 that is coupled to RF units 704-708, user devices 710 and 712, and Overlapping Basic Service Set (OBSS) AP (not shown).

In operation, since RF units 704-708 may be unaware of connection details between user device (e.g., 712) and RF units 704-708, and signals are combined in intermediate node 702, it is advantageous to have means of connection discovery to identify which or user devices 710 and 712 is close to which one of RF unit 704-708. In embodiments, this information may be used for Basic Service Set (BSS) coloring operations, MIMO matrix diagonalization if operating in MU-MIMO mode, and for controlling interference.

In embodiments, RF units 704-708 may generate a sequence of user IDs for user devices 710, 712 and timing information and provide that information to a correlation module (shown FIG. 7B), which may be remotely located. RF units 704-708 may generate the sequence of user ID, e.g., by processing Wi-Fi header information. In embodiments, e.g., if an RF unit cannot generate the sequence of user IDs, it may generate the sequence of received signal strengths and timing information. In response, correlation module 722 may use correlation techniques to determine which user device 710, 712 is close and/or connected to which RF unit 704-708. RF unit 704 may communicate with Wi-Fi AP 702 and correlation module 722 and perform any of steps 730-740 in FIG. 7B.

Further, in embodiments, Wi-Fi AP 702 and correlation module 722 may use information related to the characteristics of different Ethernet cables (e.g., low-pass properties, electrical length, etc.), interference, and/or power information to detect or infer a relationship of sources based on signals received from any of RF units 704-708, e.g., by employing statistical analysis or other methods. Furthermore, in embodiments, the sequence of user ID and timing information may be used to disconnect OBSS interference at an OBSS AP. For example, RF units 704-708 may perform basic physical layer header processing steps to identify color, e.g., by utilizing a small dedicated processing circuit or ASIC. In embodiments, based on header information, an RF unit (e.g., 704) may drop packets from interfering devices of the same color, or turn off one or more links between the RF unit and intermediate node 702, or reduce their gain, e.g., to prevent OBSS interfering signals of user device 710 from reaching intermediate node 702; to enter a sleep mode to control the inner-ESS interference; or in preparation for performing channel matrix diagonalization.

Advantageously, in embodiments, links between RF units 704-708 and intermediate node 702 may be turned off significantly faster when compared to existing designs. This is mainly due to the fact that physical layer processing can be accomplished without having to perform relatively complex and time-consuming OFDM demodulation, layer 2 decoding, and/or MAC processing (e.g., MAC header examination, MAC address extraction, etc.) to determine whether user device 710 causes actual interference.

Figure 7B:
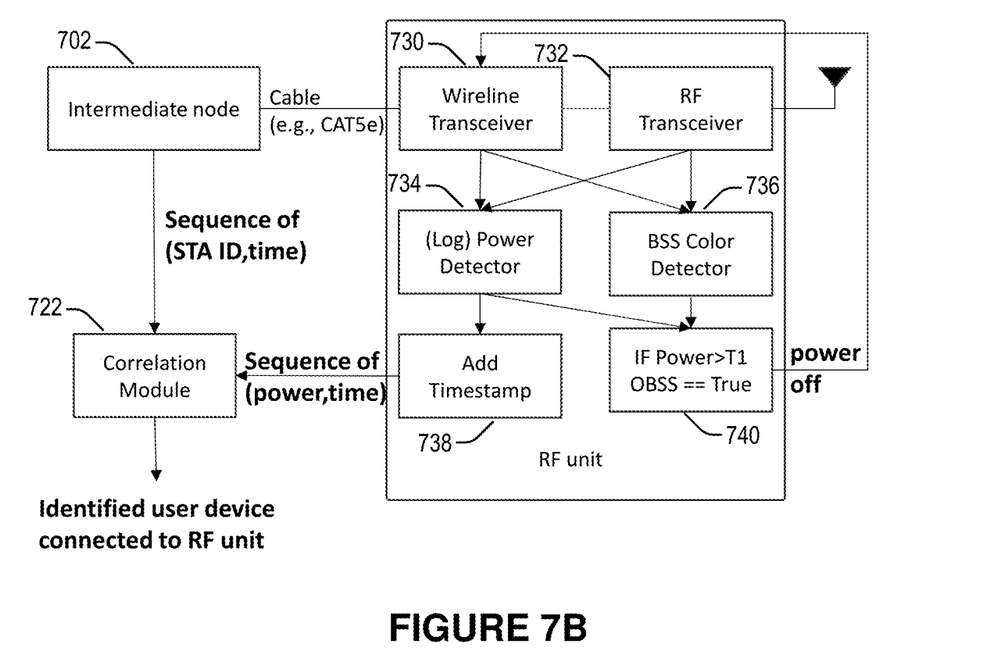
FIG. 7B block diagram of an exemplary components of a system for facilitating connection discovery according to various embodiments of the present disclosure.

FIG. 7B block diagram of an exemplary components of a system for facilitating connection discovery according to various embodiments of the present disclosure. For simplicity, only intermediate node 702, correlation module 722, and RF unit 704 are depicted in FIG. 7B.

In embodiments, to facilitate connection discovery, a power detector may be used. Due to the nature of Wi-Fi applications, in which different users transmit at different non-overlapping time slots, device identification may be performed, e.g., by utilizing measured power received at each RF unit (or any other evaluation metric indicative of connection quality, such as RSRP, RSSI, etc.), and a timing reference (e.g., time stamp) may be assigned. Advantageously, such embodiments do not require decoding or demodulation and, for Ethernet connections between intermediary node and RF units, Ethernet cables may be used to transmit control messages, timing information, e.g., time references and time sequences, etc., and so on. As an additional benefit, in embodiments, physical layer header processing may be used in sleep mode, e.g., until certain events trigger MAC layer processing.

Overall, knowledge regarding the relationships between network components, such as RF units 704-708 and user devices 710-712, allows users to apply elegant management methods that improve network performance with less effort and power consumption.

Figure 8:
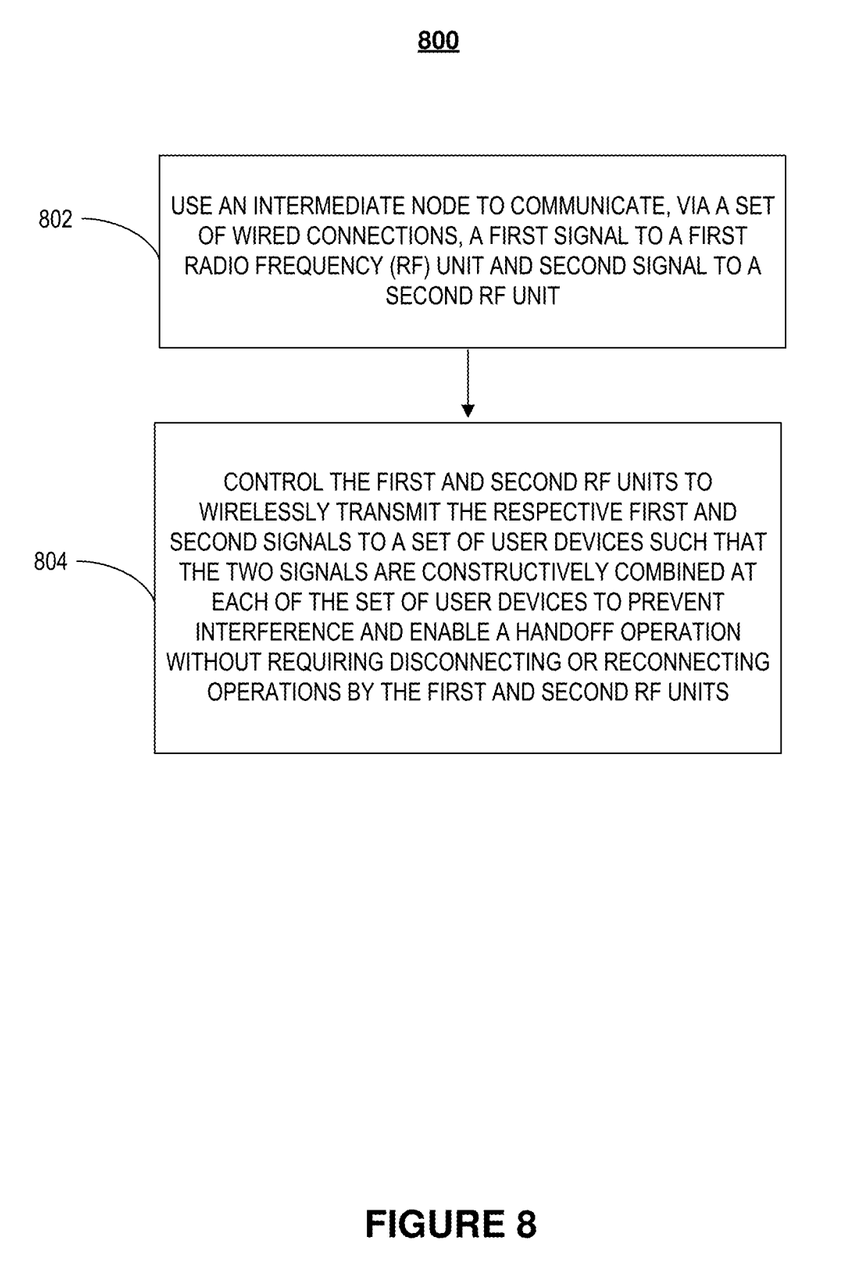
FIG. 8 is a flowchart of an illustrative process for increasing performance in a communications network, in accordance with various embodiments of the present disclosure.

FIG. 8 is a flowchart of an illustrative process for increasing performance and reducing latency in a communications network, in accordance with various embodiments of the present disclosure. The process for increasing performance starts, at step 802, when an intermediate node is used to communicate (e.g., via a set of wired connections) a first signal to a first RF unit and a second signal to a second RF unit. At step 804, the first and second RF units may be controlled to wirelessly transmit the respective first and second signals to a set of user devices such that the two signals are constructively combined at each of the set of user devices to prevent interference and enable a handoff operation without requiring disconnecting or reconnecting operations by the first and second RF units.

Figure 9:
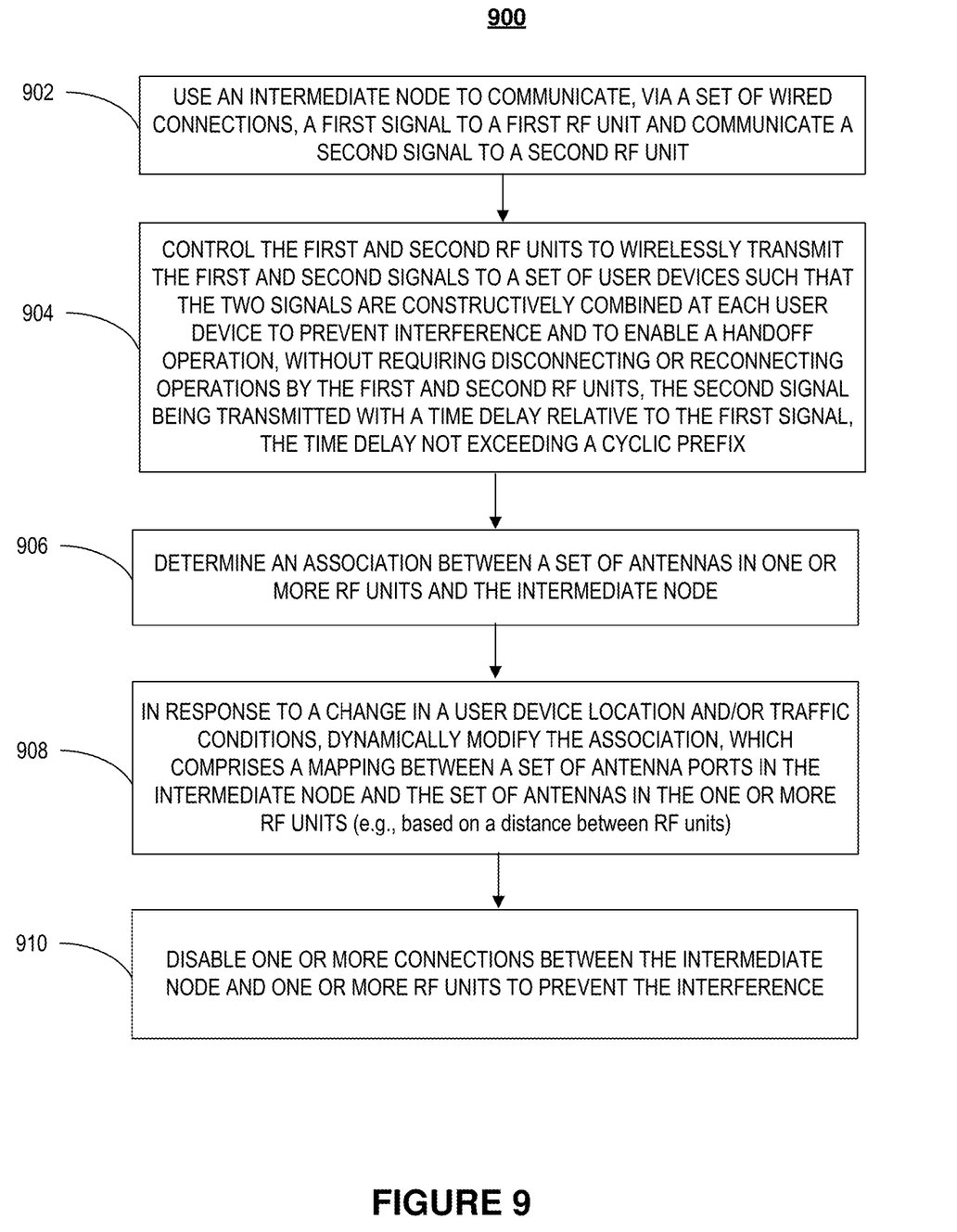
FIG. 9 is a flowchart of a mode detailed process for increasing performance in a communications network, in accordance with various embodiments of the present disclosure.

FIG. 9 is a flowchart of a mode detailed process for increasing performance in a communications network, in accordance with various embodiments of the present disclosure.

The first two steps, 902 and 904 in FIG. 9 are identical to steps 802 and 804 in FIG. 9. However, this is not intended as a limitation on the scope of the present disclosure. At step 906 in FIG. 9, an association between a set of antennas in one or more RF units and the intermediate node may be determined. At step 908, in response to a change in at least one of a user device location or a change in traffic conditions, the association may be updated. In embodiments, the association may comprise a mapping between a set of antenna ports in the intermediate node and the set of antennas in the one or more RF units. In embodiments, the mapping may be at least partially based on a distance between RF units. Finally, at step 910, one or more connections between the intermediate node and one or more RF units may be disabled to prevent the interference.

One skilled in the art shall recognize that: (1) certain steps may optionally be performed; (2) steps may not be limited to the specific order set forth herein; (3) certain steps may be performed in different orders; and (4) certain steps may be done concurrently.

In embodiments, where a connection between a user device and RF nodes is not known, a correlation unit, such as that module shown FIG. 7B, may be used to correlate user device ID and timing information that may have been received from an intermediate node, and power and timing information that may have been received from an RF unit, to identify a user device that is closer to the RF unit than a second user device. Based on the identification, steps comprising at least one of BSS coloring, block diagonalization, or controlling inter-ESS interference may be performed. In embodiments, the RF unit may be used to obtain physical layer header information and use that information, e.g., to turn off a link between the first RF unit and the intermediate node to prevent an OBSS interfering signal of a user device from reaching the intermediate node.

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smartphone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, a touchscreen, and/or a video display. The computing system may also include one or more buses operable to transmit communications between the various hardware components.

Figure 10:
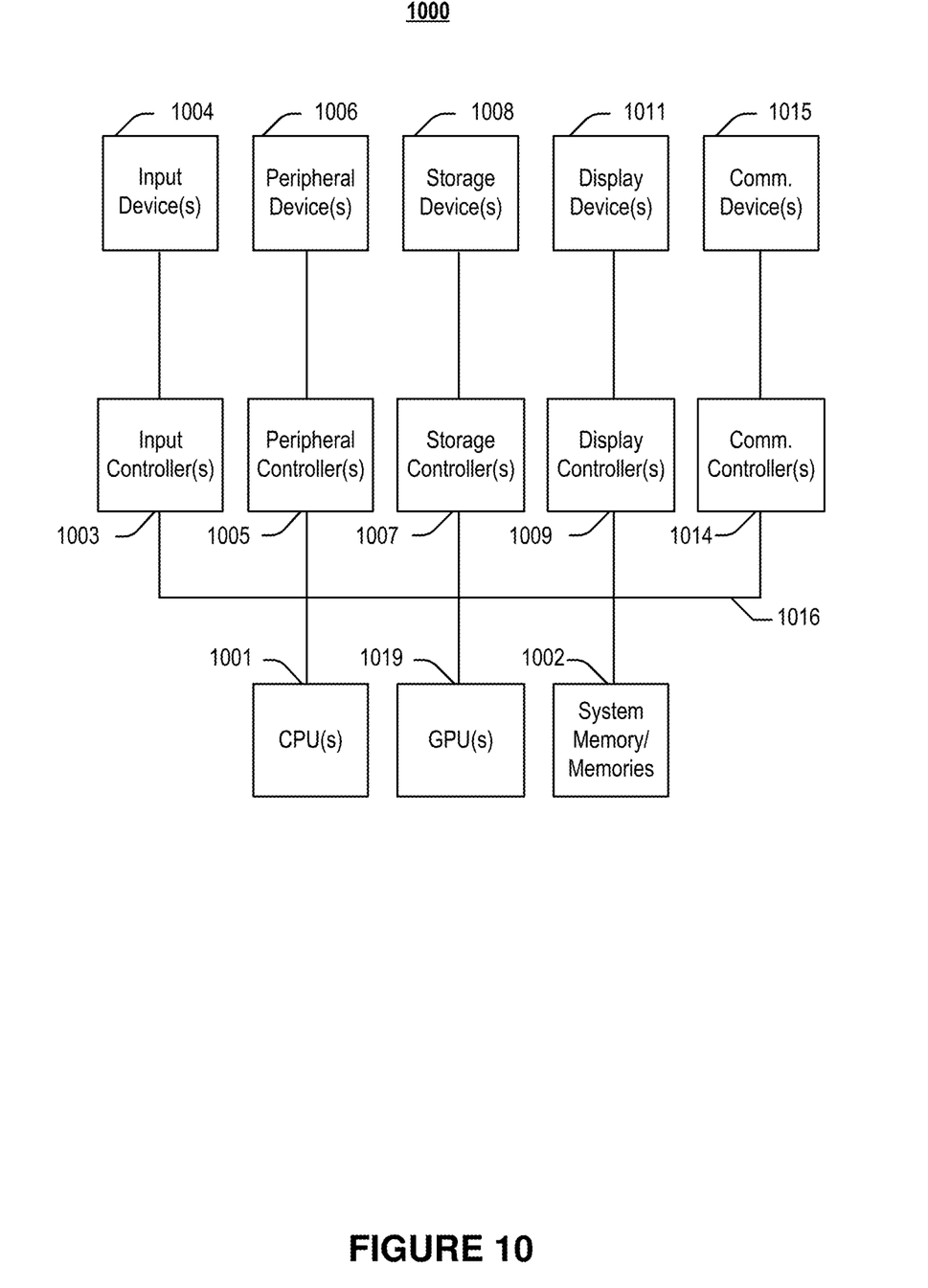
FIG. 10 depicts a simplified block diagram of a computing system according to various embodiments of the present disclosure.

FIG. 10 depicts a simplified block diagram of a computing system according to various embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more central processing units (CPU) 1001 that provide computing resources and control the computer. CPU 1001 may be implemented with a microprocessor or the like, and may also include one or more graphics processing units (GPU) 1019 and/or a floating-point coprocessor for mathematical computations. System 1000 may also include a system memory 1002, which may be in the form of random-access memory (RAM), read-only memory (ROM), or both.

A number of controllers and peripheral devices may also be provided, as shown in FIG. 10. An input controller 1003 represents an interface to various input device(s) 1004, such as a keyboard, mouse, touchscreen, and/or stylus. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), a thin film transistor (TFT) display, organic light-emitting diode, electroluminescent panel, plasma panel, or other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fiber Channel over Ethernet (FCOE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable mediums including, but not limited to magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or fabricate circuits (i.e., hardware) to perform the processing required.

It shall be noted that embodiments of the present invention may further relate to computer products with a non-transitory, tangible computer-readable medium that has computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher-level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for increasing performance in a communications network, the method comprising:
    using an intermediate node to communicate, via a set of wired connections, a first signal to a first radio frequency (RF) unit and a second signal to a second RF unit;
    controlling the first and second RF units to wirelessly transmit the respective first and second signals to a user device such that the two signals are constructively combined at the user device to prevent interference; and
    controlling the first and second RF units to enable a handoff operation without requiring disconnecting or reconnecting operations by the first and second RF units.

2. The method of claim 1, further comprising, determining a mapping between a set of antenna ports in the intermediate node and a set of antennas in one or more RF units.

3. The method of claim 2, in response to a change in at least one of a location of the user device or a change in traffic conditions, updating the mapping.

4. The method of claim 2, wherein the mapping is based at least in part on a distance between the first RF unit and the second RF unit.

5. The method of claim 1, further comprising, deactivating at least one or more RF units, or one or more connections between the intermediate node and one or more RF units to prevent the interference.

6. The method of claim 1, wherein the intermediate node causes one or more RF units to be spatially separated from the nearest interfering user device by a distance that reduces intra-extended service set (ESS) interference.

7. The method of claim 1, further comprising, selectively enabling RF units having a same extended service set (ESS) identifier (ESSID) and being associated with different cells to reduce inter-ESS interference.

8. The method of claim 1, further comprising, establishing a connection between two RF units that are coupled to a same RF port on the intermediate node and the user device to extend a range for the user device.

9. The method of claim 1, further comprising, enabling block diagonalization for multi-user Multiple-Input Multiple-Output (MIMO) channel applications by performing steps comprising:
   selecting a first user device that is coupled with the first RF unit located relatively closer to the first user device than the second RF unit;
   selecting a second user device that is coupled with the second RF unit located relatively closer to the second user device than the first RF unit; and
   associating antenna ports of the intermediate node to antennas of the first and second RF units such that a correlation between the signals at the antenna ports in the intermediate node connected to the first RF unit and the signals at the antenna ports in the intermediate node connected to the second RF unit is reduced.

10. The method of claim 9, wherein the correlation is minimized by connecting a first set of antenna ports among the antenna ports at the intermediate node to the first RF unit and connecting a second set of antenna ports of antenna ports among the antenna ports at the intermediate node to the second RF unit, the first set and the second set of antenna ports being different from each other.

11. The method of claim 1, further comprising, establishing a connection between a user device and two RF units whose antennas are coupled to a number of different antenna ports on the intermediate node to make, the number being equal to a number of spatial streams.

12. The method of claim 1, wherein the intermediate node dynamically switches the first RF unit and the second RF unit between two or more user devices to increase a capacity.

13. The method of claim 12, further comprising using a connection discovery technique comprising:
   identifying a first user device that is transmitting a packet as being close to an RF unit; and
   using the identification to perform steps comprising at least one of:
      Basic Service Set (BSS) coloring;
         in a multi-user multiple-input multiple-output (MU-MIMO) mode,
      matrix diagonalization; or
      controlling interference.

14. The method of claim 13, wherein BSS coloring comprises, in response to the intermediate node receiving from the RF unit a signal that is not associated with a BSS color that is assigned to either the RF unit or the intermediate node, disconnecting a connection between the intermediate node and the RF unit.

15. The method of claim 13, wherein the MU-MIMO mode comprises, in response to the intermediate node receiving from the first or second user device a signal that is at least one of being not selected for MU-MIMO or being from a selected user and smaller than a threshold, disconnecting or reducing a gain of a connection between the intermediate node and the RF unit.

16. The method of claim 13, wherein controlling interference comprises in response to a connection between the intermediate node and an RF unit not being associated with a selected user, disconnecting the connection.

17. The method of claim 13, wherein identifying the first user device comprises using a correlation between a user device identifier (ID) and timing information received from the intermediate node and power and timing information received from one or more RF units.

18. The method of claim 17, wherein the user device ID is obtained from a sequence of user device IDs obtained from information in a physical or Media Access Control (MAC) layer header.

19. An intermediate node for increasing performance in a communications network, the intermediate node comprising:
   a processor; and
   a non-transitory computer-readable medium comprising instructions that, when executed by the processor, cause steps to be performed, the steps comprising:
      communicating via a set of wired connections a first signal to a first radio frequency (RF) unit and a second signal to a second RF unit;
      controlling the first and second RF units to wirelessly transmit the respective first and second signals to a device such that the two signals are constructively combined at a user device to prevent interference; and
      controlling the first and second RF units to enable a handoff operation without requiring disconnecting or reconnecting operations by the first and second RF units.

20. A radio frequency (RF) unit for increasing performance in a communications network, the RF unit comprising:
   a processor; and
   a non-transitory computer-readable medium comprising instructions that, when executed by the processor, cause steps to be performed, the steps comprising:
      in response to the RF unit receiving from an intermediate node, via a wired connection, a first signal, wirelessly transmitting the first signal to a user device such that the first signal, at the user device, constructively combines with a second signal, which has been wirelessly transmitted to the user device by at least one other RF unit, such as to prevent interference between the first and second signals; and
      enabling a handoff operation between the RF unit and the at least one other RF unit without requiring disconnecting or reconnecting operations by the RF unit.

* * * * *